United States Patent Office 2,747,922
Patented May 29, 1956

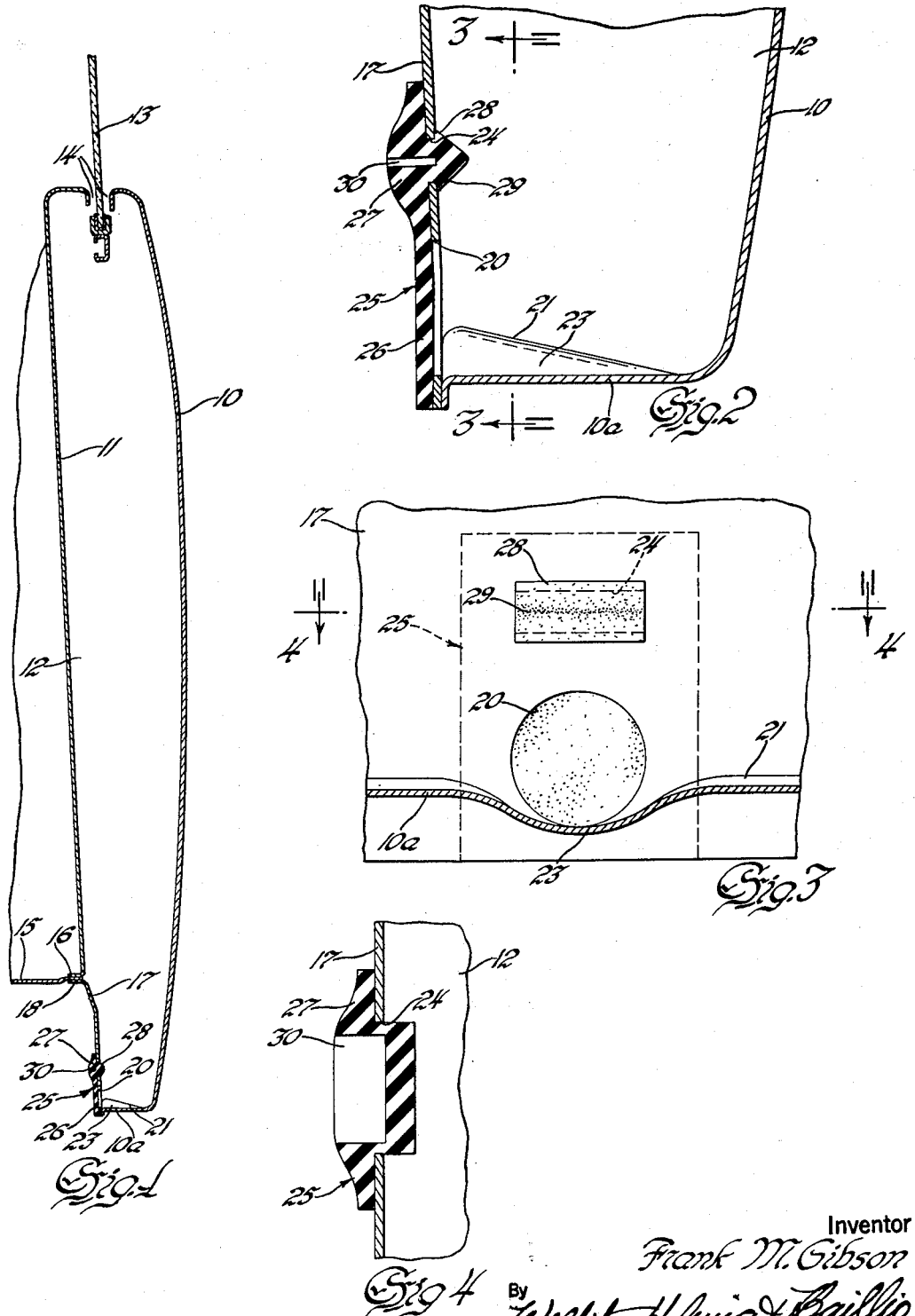

2,747,922

VEHICLE WINDOW WELL DRAINAGE AND SEALING MEANS

Frank M. Gibson, Detroit, Mich., assignor to General Motors Corporation, Detroit, Mich., a corporation of Delaware Application October 30, 1952, Serial No. 317,688

3 Claims. (Cl. 296—44)

This invention relates to vehicle sealing means, and more particularly to improved drainage and sealing means for an automobile body.

While it will be apparent from the following description of the invention that it may be used in many places in a vehicle, the invention is particularly advantageous in sealing the rear quarter section of an automobile having a vertically slidable rear quarter window, as is found, for example, in a two-door automobile.

The rear quarter of the body portion of such an automobile provides a box-like space into which the rear quarter window descends when the window is lowered. Moisture may enter this box-like space through the window opening in the upper edge of the rear quarter panel, and drainage openings have conventionally been provided in the bottom of the box-like section to permit the water to drain out of the body. However, the box-like space communicates with the interior of the automobile through that portion of the above mentioned window opening on the inner side of the window glass, and if a constantly open drain opening is provided, dust will be drawn into the interior of the automobile. When the automobile is driven at moderate or high speeds the rush of air past the body creates a degree of vacuum inside the automobile body so that suction causes dust, etc., to be drawn through the drain holes into the box-like space in the rear quarter section, and this dust is drawn by suction through the window opening in the rear quarter panel into the interior of the automobile. The degree of vacuum is increased if one or more of the windows is open.

The invention provides a novel arrangement wherein a check valve is provided so that water may drain from the above mentioned box-like section to the exterior of the automobile, but entry of dust or other matter into the automobile through the drainage opening is prevented.

Other features and advantages of the invention will be apparent from the following specification and from the drawings, in which:

Fig. 1 is a fragmentary vertical transverse section through the rear quarter panel of an automobile using the novel check valve arrangement, this section being taken rearwardly of the door rear pillar of a two-door automobile;

Fig. 2 is an enlarged fragmentary section corresponding to the lower portion of Fig. 1;

Fig. 3 is a section taken along the line 3—3 of Fig. 2 and looking at the interior surface of the inner rocker panel; and Fig. 4 is a fragmentary section through the rocker panel and check valve taken along the line 4—4 of Fig. 3.

Referring now more particularly to the drawings, in a two-door automobile a substantially vertical outer rear quarter panel 10 extends rearwardly from adjacent the door rear pillar of the automobile, and an inner rear quarter panel 11 is generally parallel to and spaced from the outer panel 10 to provide a space 12 into which a rear quarter window 13 may descend when the window is lowered. As shown in Fig. 1, an opening 14 for the window is provided along the top edge of the panels 10 and 11. The inner rear quarter panel 11 terminates at its lower end at the floor panel 15 of the automobile, the lower edge of the panel 11 having a flange 16 which is secured to the floor panel, as by welding or other means. The outer rear quarter panel 10 extends downwardly below the level of the floor 15 and has a substantially horizontal portion 10a which extends inwardly and is joined to the lower edge of a substantially vertical inner rocker panel 17, which extends upwardly from the horizontal portion 10a of the outer rocker panel to the floor 15, the rocker panel having a flange 18 at its upper edge which is secured to the outer edge of the floor panel as by welding or other means. The rocker panel 17 thus forms a wall portion of the automobile body.

The rocker panel 17 is provided adjacent its lower edge with a drainage opening 20, and the generally horizontal poriton 10a of the outer rear quarter panel, which slopes in a direction outwardly of the automobile throughout most of its length as shown at 21 in Figs. 1 and 2, is formed with a depression 23 adjacent the drainage opening 20, as shown in Fig. 3. The sloping portion 21 and depression 23 provide a drain trough to the drainage opening 20. A second opening 24 of rectangular shape is formed in the rocker panel 17 adjacent the drainage opening 20.

It will be seen from Fig. 1 that the panels 10, 10a, 11 and 17 enclose the box-like space 12, which is substantially closed except for the openings at the bottom and the window opening 14 at the top. While a drainage opening is essential in order to avoid an accumulation of water in the space 12, if the drainage opening 20 were left open, the partial vacuum condition created inside the automobile body when the automobile is moving at moderate or high speeds would cause dust, which is stirred up by the wheels of the automobile, to be sucked into the space 12 through the drainage opening 20, and thence to be sucked into the interior of the automobile through that portion of the space 14 which is inside the window 13.

In order to avoid this undesirable dust entry I provide a flexible check valve, designated generally as 25, adapted to cover the drain opening 20, said check valve allowing drainage of moisture from the space 12 to the exterior of the automobile through the drainage opening 20, but preventing the entry of dust or other matter into the space 12 through the opening 20.

The check valve 25 preferably is made of rubber, though other flexible materials will suffice. The valve 25 has a flexible body portion 26 of larger surface area than the drainage opening 20, and a thickened mounting portion 27. A stud, which is also flexible and which is preferably molded integrally with the valve 25, projects from the mounting portion 27 of the check valve, said stud having a portion 28 adjacent its free end which is of a larger transverse sectional area than a rectangular mounting opening 24 which is provided adjacent the opening 20, and a portion 29 intermediate its ends of substantially similar size and shape as the opening 24. The stud projects through the opening 24 to close said opening and mount the check valve 25 on the exterior surface of the rocker panel 17 in a position so that the body portion 26 of the valve is adapted to cover the drainage opening 20, as shown best in Figs. 1 and 2. In order to facilitate mounting the valve on the panel 17 the valve is provided with a well 30 through the mounting portion 27 and of such depth that it extends into the stud to a point adjacent the intermediate portion 29, as shown best in Figs. 2 and 4.

In the event the automobile is out in the rain, is washed, or is otherwise subjected to moisture which may enter the space 12 through the opening 14, the moisture will fall to the bottom of the space 12 and be conducted to the drainage opening 20 by means of the trough formed by the sloping portion 21 and the depression 23, and the water will leak through the opening 20 past the valve 25. If the automobile is in rapid motion, and particularly if one of the windows slightly open, suction caused by the partial vacuum in the automobile may partially or entirely prevent this leakage, since the suction will close the check valve by pressing the check valve firmly against the exterior surface of the rocker panel 17. Even if the valve action is such that no leakage is present at high speeds, the leakage will occur as soon as the automobile stops. On the other hand, whenever the automobile is in motion the suction effect will close the check valve sufficiently to prevent the entry of dust or other matter into the space 12 through the drainage opening 20.

While I have shown and described certain embodiments of my invention, it is subject to many modifications. Changes, therefore, in the construction and arrangement may be made without departing from the spirit and scope of the invention as set forth in the appended claims.

I claim:

1. Automobile body sealing apparatus of the character described, including: a body rocker panel having a substantially vertical portion comprising an exterior wall of an automobile body, said portion having a drainage opening therethrough; an outer body panel having a substantially vertical portion spaced from said rocker panel and a substantially horizontal portion joined with said rocker panel along the lower edge thereof, said horizontal portion having a depression providing a drainage trough to said drainage opening; and a flexible check valve mounted on the exterior surface of said rocker panel adjacent said opening and adapted to allow drainage from said automobile body, but to prevent entry of dust into said automobile body through said opening.

2. Automobile body sealing apparatus of the character described, including: a body rocker panel having a substantially vertical portion comprising an exterior wall of an automobile body, said portion having a drainage opening therethrough and a second opening adjacent said drainage opening; an outer body panel having a substantially vertical portion spaced from said rocker panel and a substantially horizontal portion joined with said rocker panel along the lower edge thereof, said horizontal portion having a depression providing a drainage trough to said drainage opening; a check valve having a mounting portion and a flexible body portion of larger surface area than said drainage opening; and a flexible stud projecting from the mounting portion of said check valve and having a portion adjacent its free end of larger transverse sectional area than said second opening and a portion intermediate its ends of substantially similar transverse sectional size and shape as said second opening, said stud projecting through said second opening to close said second opening and mount said check valve on said panel in a position adapted to cover said drainage opening to allow drainage from said automobile body, but to prevent entry of dust into said automobile body through said opening.

3. Automobile body sealing apparatus of the character described, including: an inner body panel having a portion comprising an exterior wall of an automobile body; an outer body panel having a portion spaced from but generally parallel to said inner panel, one of said panels having a connecting portion extending between the inner and outer panels and secured thereto to form a compartment, and one of said panels having a drainage opening therethrough leading from said compartment adjacent the connecting portion and a second opening adjacent said drainage opening, and a drainage trough in one of said panels leading to said drainage opening; and a check valve having a mounting portion and a flexible body portion of larger surface area than said drainage opening, and a flexible stud projecting from the mounting portion of the check valve and having a portion adjacent its free end of larger transverse sectional area than said second opening and a portion intermediate its ends of substantially similar transverse sectional size and shape as said second opening, said stud being snapped into said second opening to mount said check valve on the body in a position where it covers said drainage opening and allows drainage from the automobile body but prevents entry of dust into said automobile body through said opening.

References Cited in the file of this patent

UNITED STATES PATENTS

| | | |
|---|---|---|
| 1,159,530 | Murphy | May 23, 1939 |
| 2,184,553 | Johnson | Dec. 26, 1939 |
| 2,187,331 | Schulz et al. | Jan. 16, 1940 |
| 2,203,753 | Strandt | June 11, 1940 |
| 2,224,494 | White | Dec. 10, 1940 |
| 2,253,818 | Simpson | Aug. 26, 1941 |
| 2,585,438 | Clingman | Feb. 12, 1952 |
| 2,608,434 | Brockway | Aug. 26, 1952 |
| 2,697,257 | Montgomery | Dec. 21, 1954 |

FOREIGN PATENTS

| | | |
|---|---|---|
| 897,256 | France | May 22, 1944 |